United States Patent [19]

Chenausky et al.

[11] 4,123,149
[45] Oct. 31, 1978

[54] UNSTABLE RESONATOR HAVING HIGH MAGNIFICATION

[75] Inventors: Peter P. Chenausky, Avon; William H. Glenn, Vernon, both of Conn.

[73] Assignee: United Technologies Corporation, Hartford, Conn.

[21] Appl. No.: 814,052

[22] Filed: Jul. 8, 1977

[51] Int. Cl.² ............................................. H01S 3/082
[52] U.S. Cl. .............................. 350/294; 331/94.5 C; 331/94.5 L; 350/299
[58] Field of Search ............... 331/94.5 C, 94.5 D, 331/94.5 L; 350/294, 299

[56] References Cited

U.S. PATENT DOCUMENTS

| 3,928,817 | 12/1975 | Chodzko ........................ 331/94.5 C |
| 4,016,504 | 4/1977 | Klauminzer .................... 331/94.5 C |

OTHER PUBLICATIONS

Eesley et al., Dye-Laser Cavity Employing a Reflective Beam Expander, IEEE J. Quant. Electr., vol. QE-12, No. 7 (Jul. 1976) pp. 440-442.

*Primary Examiner*—William L. Sikes
*Attorney, Agent, or Firm*—Lawrence A. Cavanaugh

[57] ABSTRACT

An unstable resonator having high magnification and capable of accommodating an active medium having high gain and small dimensions is disclosed. The unstable resonator, formed with a pair of coupled cavities, has a diffraction grating capable of providing high resolution of the bandwidth of radiation from a high gain medium such as a dye medium and is capable of providing a laser beam with a continuous cross-section having far field characteristics of high quality.

16 Claims, 3 Drawing Figures

UNSTABLE RESONATOR HAVING HIGH MAGNIFICATION

BACKGROUND OF THE INVENTION

1. Field of the Invention

The present invention relates to lasers and more particularly to unstable resonators capable of accommodating a gain medium having high gain and large bandwidth to provide an output beam having good optical qualities and high bandwidth resolution.

2. Description of the Prior Art

Coherently pumped dye lasers having bandwidths appropriately narrowed in frequency are utilized for many applications. The coherently pumped dye laser is characterized by an active medium having high gain, small cross-sectional area and large gain bandwidth and is capable of providing laser radiation having bandwidths with high resolution by utilizing intracavity dispersive optical elements and intracavity etalons. Since the cross-sectional area of the active medium is typically very small, beam expansion optics are required to illuminate a sufficient area on the dispersive optics to obtain the desired narrowing of the radiation bandwidth. Only modest narrowing of the bandwidth is obtainable without expanding the intracavity radiation since the proper operation of the dispersive optics is functionally dependent on the size of the intracavity laser radiation.

The principal areas of the prior art which are improved by the present invention are the elimination of the intracavity beam expanding optics and the use of a resonator configuration having transverse mode discrimination capable of providing a laser beam confined to the lowest loss mode and of minimizing the effect of inhomogeneities in the active medium. Prior art resonators for use in conjunction with a dye gain medium typically have little transverse mode control capabilities.

A general discussion of unstable resonators with related references is presented by Chenausky, et al in U.S. Pat. No. 3,969,685 filed Dec. 6, 1974 and held with the present application by a common assignee. These references do not disclose the utilization of unstable resonators having high gain medium such as dye.

SUMMARY OF THE INVENTION

A primary object of the present invention is to provide an unstable resonator having high magnification. Another object is to provide a laser beam having a narrow bandwidth, from a dye gain medium.

According to the present invention an unstable resonator having high magnification comprises a first optical cavity, defined at one end by a first mirror and at the other end by a diffraction grating, including a reflector mirror having an aperture and a reflective surface capable of optically connecting the first mirror and the diffraction grating wherein the first mirror and the reflector mirror are positioned on and symmetrically about a centerline axis, and a second optical cavity, partially superimposed on the first optical cavity, defined at one end by the first mirror and at the other end by a second mirror positioned on and symmetrically about the centerline axis and having a focal length much less than the separation between the respective mirrors, wherein the first and second mirrors are optically connected through the aperture in said reflector mirror. In one embodiment the unstable resonator further includes an active gain medium disposed within the second cavity and means within the second cavity for out coupling a laser beam from the resonator.

A primary feature of the present invention is the high magnification of the unstable resonator. Additionally, the unstable resonator is formed with a pair of cavities in optical communication with one another. The first and second mirrors have concave reflective surfaces centrally located on a centerline axis and separated from one another sufficient to have a common focal plane. Also, the small focal length of the second mirror produces a second cavity having a high magnification. The aperture in the reflector mirror is centrally positioned about the centerline axis near the common focal plane and is capable of providing spatial filtering to suppress high order modes of the radiation within the second cavity. The second cavity is capable of expanding the radiation to provide radiation having a large diameter to the first cavity. The diffraction grating defining one end of the first cavity is capable of narrowing the bandwidth of the radiation to obtain high resolution. In an embodiment of the present invention, the second cavity is capable of accommodating an active medium, having high gain and small transverse dimensions, between the second mirror and the reflector mirror. The second mirror has a partially reflecting surface capable of partially reflecting and partially transmitting the intracavity radiation. Also, the second mirror is formed with material transmissive at the wavelength of the radiation and is capable of out coupling from the resonator a laser beam having a continuous cross section. Additionally, the resonator is capable of accommodating an etalon to further improve the resolution of the bandwidth.

A primary advantage of the present invention is the narrow bandwidth of the laser radiation produced without utilizing transmissive intracavity beam expansion optics. Additionally, the transverse mode discrimination of the unstable resonator minimizes the effect of inhomogeneities in the active medium. Also, the high magnification of the resonator allows the aperture in the reflector mirror to function as a spatial filter capable of discriminating against high order resonator modes to produce a laser beam having high optical quality. Additionally, the laser beam has good far field characteristics suitable for optical communication and optical radar and the high resolution of the bandwidth of the laser beam is suitable for isotope separation.

The foregoing and other objects, features and advantages of the present invention will become more apparent in the light of the following detailed description of the preferred embodiments thereof as illustrated in the accompanying drawing.

DESCRIPTION OF THE PREFERRED EMBODIMENT

Figure 1:
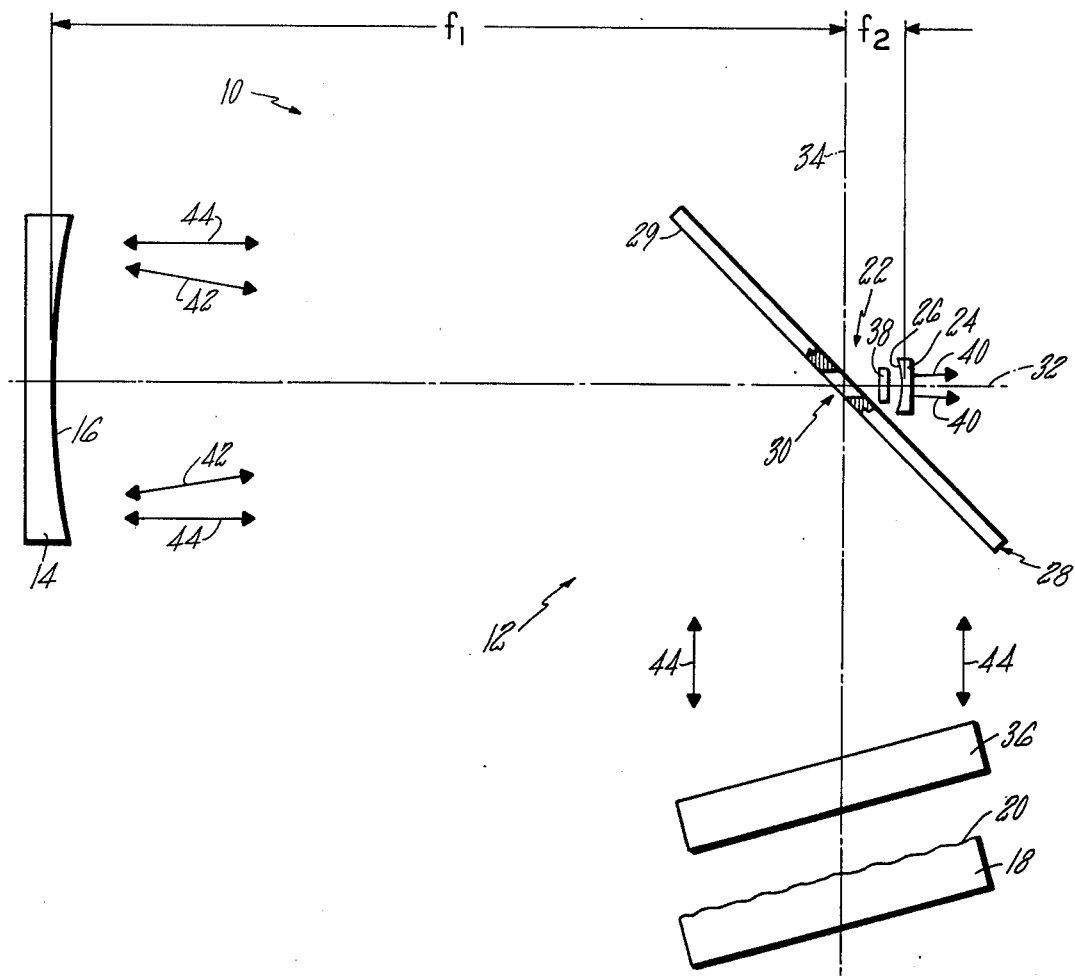
FIG. 1 is a simplified schematic of the present invention showing the principal optical elements cooperating with a gain medium to provide a laser beam.

The apparatus as shown in FIG. 1 is a simplified schematic of the present invention for an unstable resonator having high magnification with coupled cavities. The unstable resonator 10 has a first cavity 12 defined at one end by a first mirror 14 having a concave surface 16 with a focal length of $f_1$ and at the other end a diffraction grating 18 having grating lines 20 and a second cavity 22, partially superimposed on the first cavity, defined at one end by the first mirror 14 and at the other end by a second mirror 24 having a second concave surface 26 with a focal length of $f_2$ and includes a reflector mirror 28 having a flat reflective surface 29 with an aperture 30 located between the first mirror and the second mirror. The first mirror, the second mirror and the reflector mirror are all concentrically located on a centerline axis 32 with the first and second mirrors having a common focal plane 34. The flat reflective surface of the reflector mirror intercepts the centerline axis at an angle and forms a folded optical path between the concave surface of the first mirror and the diffraction grating to provide line of sight communication therebetween to define the optical path of the first cavity. An etalon 36 is located within the first cavity between the grating 18 and the reflector mirror 28 and a dye cell 38 having a high gain medium and small transverse dimensions is located within the second cavity between the reflector mirror 28 and the second mirror 24. A laser beam 40 is out coupled from the resonator through the second mirror 24 formed with material transmissive at the wavelength of the laser beam.

Figure 2:
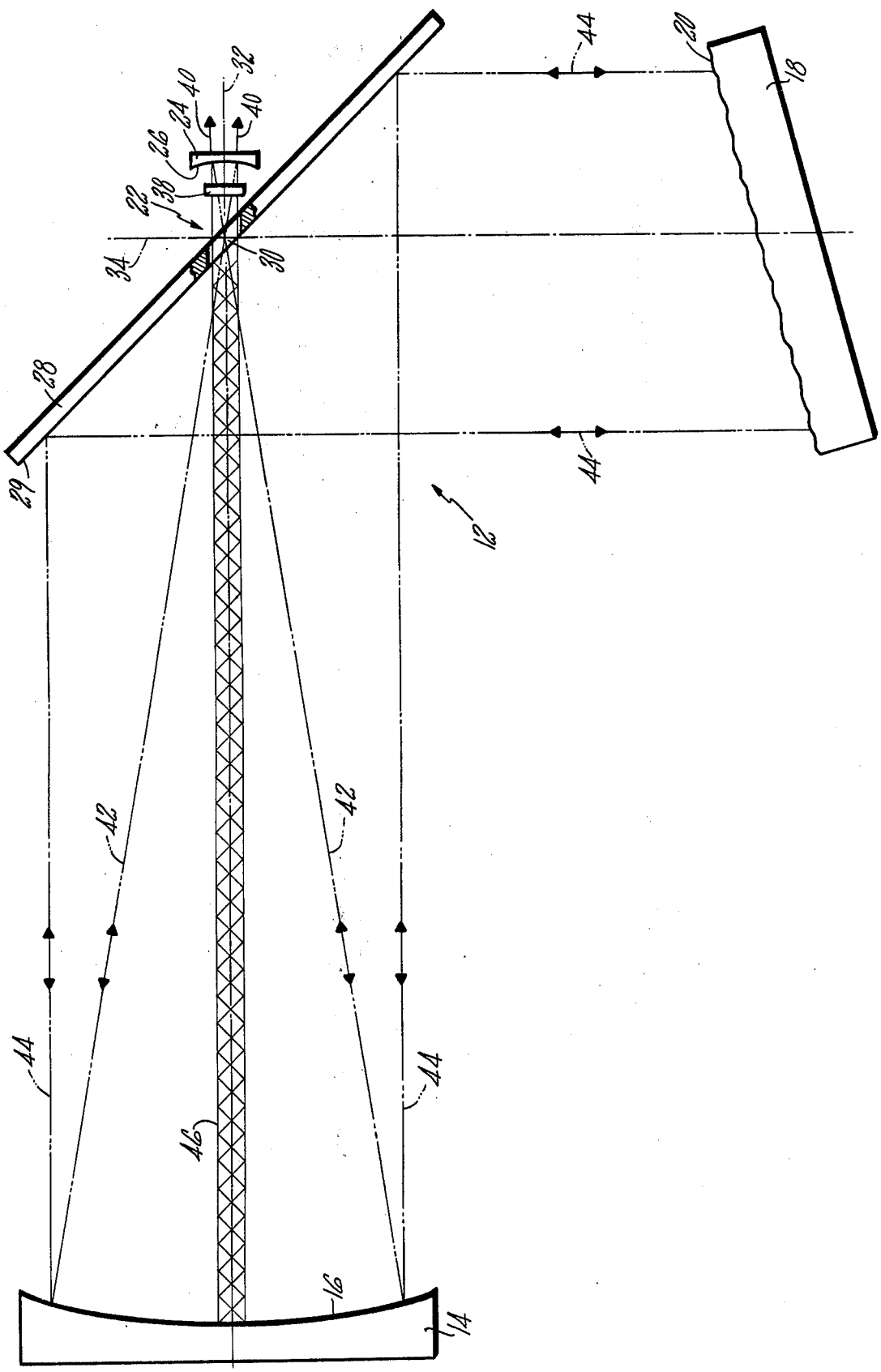
FIG. 2 is a simplified schematic of the present invention showing the optical path of the radiation within the resonator.

FIG. 2 shows a simplified ray trace of the optical path within the resonator. Radiation 42 expanding from the common focal plane 34 of the first and second mirrors is incident onto the concave surface 16 of the first mirror 14 and is reflected into the first cavity as a collimated beam 44 having a large diameter. The collimated beam 44 is reflected by the flat reflecting surface 29 of the reflector mirror 28 and is incident onto the diffraction grating 18. The collimated beam retroreflected by the grating is reflected by the flat reflecting surface 29 and is collected by the first mirror and focused at the common focal plane 34. The radiation diverging from the common focal plane is collected by the reflecting surface 26 of the second mirror and reflected back through the aperture 30 to the first mirror as a second collimated beam 46 having a reduced diameter. Multiple reflections of the second collimated beam between the first and second mirrors compresses the second collimated beam toward the centerline axis to promote the desired mode characteristic of the resonator. This process continues until natural diffraction of the compressed radiation is exactly compensated for by the compression of the radiation within the second cavity. Eventually, the second collimated beam expands, as for example, by diffractive spreading and scattering onto the first mirror which results in the collimated beam 44 within the first cavity whereupon the cycle is repeated. Thus, if the reflection losses at the second mirror are small, the coupled cavities form a high Q resonator. The large magnification ($f_1/f_2$) of the second cavity, which is a confocal negative branch unstable resonator, eliminates the need for transmissive intracavity beam expanding optics to provide the collimated beam of radiation 44 having a large diameter to the first cavity. The diameter of the second collimated beam within the second cavity is a function of the reciprocal of the resonator magnification ($f_2/f_1$).

Referring now to FIG. 1 and 2. In operation, the reflector mirror 28 directs the collimated beam 44 within the first cavity 12 to the diffraction grating 18. The collimated beam is diffracted by the grating lines 20 to obtain frequency narrowing of the radiation bandwidth. The grating typically has a large number of grating lines per millimeter, for example at least six hundred, to provide adequate narrowing of the broadband gain profile typically exhibited by dye gain medium. Since the obtainable frequency narrowing is proportional to the number of lines illuminated by the laser radiation, the diameter of the beam incident on the diffraction grating should be large in order to obtain optimum conditions for spectral narrowing.

The first cavity 12 is capable of accommodating an etalon 36 typically of the Fabry-Perot type to provide additional resolution to the bandwidth of the radiation. Resolutions of the order of 1 gigahertz are readily obtainable. The etalon is typically located within the resonator to intercept the large diameter radiation to minimize "walk off" losses. FIG. 1 shows the etalon located between the reflector mirror and the diffraction grating in close proximity to the latter.

The radiation retroreflected by the grating and incident onto and reflected by the first mirror will be Fourier transformed at the common focal plane 34. Since the magnification of the second cavity is high, typically greater than 20, the focal plane distribution will be similar to an Airy function. Thus, the aperture in the reflector mirror can act as an intracavity spatial filter which will reject high order mode components. The high order components are reflected from the surface of the reflector mirror towards the grating. Since these components are diverging from the common focal plane 34, the grating 18 will not retroreflect the high order components back into the second cavity. Consequently, high order mode losses will exceed those of the desired mode and the lower loss modes will dominate. Additionally, since there is considerable freedom in locating the reflector mirror along the centerline axis 32, the spatial filtering and subsequent rejection properties of the reflector mirror may be easily altered by moving the position of the grating or by translating the reflector mirror along the centerline axis from the preferred position at the point of intersection of the common focal plane with the centerline axis. Since the dominant mode of the coupled unstable resonator is of the negative branch type, the inversion symmetry generated at the common focal plane will be beneficial in averaging out inhomogeneities within the resonator. The size of the aperture is dependent upon the magnification of the resonator.

In the preferred embodiment of the present invention the first and second mirrors have spherical reflective surfaces and the aperture in the reflector mirror is circular. It is to be recognized that cylindrical reflective surfaces on the first and second surfaces can also be employed with a rectangular shape aperture in the reflector mirror.

The dye cell 38 having high gain and large gain bandwidth is located within the second cavity between the reflector mirror and the second mirror and has dimensions small compared to the focal length of the second mirror. The size of the aperture 30 within the reflector mirror is such that the resonator will efficiently operate only with the dye cell located between the reflector mirror and the second mirror 24. The size of the aperture is such that locating a gain medium between the first mirror 14 and the reflector mirror would result in the overall laser operation being dominated by the first cavity.

Figure 3:
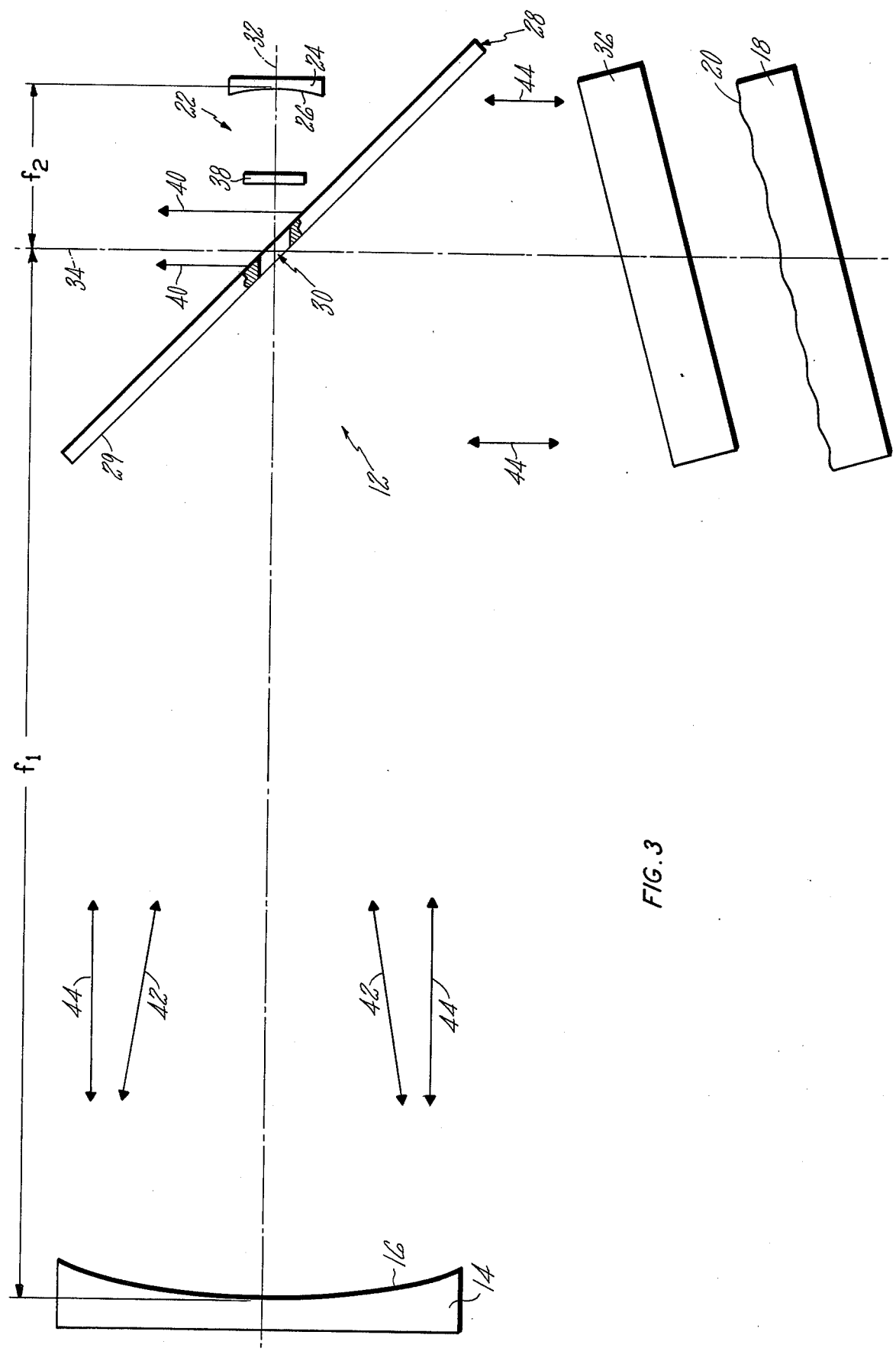
FIG. 3 is a simplified schematic of the present invention in which a laser beam is out coupled from the resonator by a reflector mirror.

In operation, laser radiation is regenerated within the gain medium located within the second cavity. The second mirror 24 is formed with material transmissive at the wavelength of the laser radiation. The second concave surface 26 is a partially reflective surface capable of reflecting a portion of the radiation incident thereon and of transmitting a portion of the radiation which passes through the second mirror to form the laser beam 40. Additionally, an aperture within the second cavity may also be utilized to couple the laser beam from the resonator. It is to be noted that the aperture could be centrally located within the first or second mirrors. Alternately, a second reflection surface on the back side of the reflector mirror cooperating with the reflective surface of the second mirror as shown in FIG. 3 will function as a stripper mirror to out couple a laser beam having a central portion with zero intensity in the near field. It is to be recognized that the use of an aperture or a stripper mirror to out-couple the laser beam 40 from the resonator will typically require the second mirror to have a surface capable of reflecting nearly all of the incident radiation.

It is to be noted that since the magnification of the resonator is large, typically in excess of 20, the unstable resonator having high magnification with coupled cavities concept can be applied to only a very limited range of laser devices, specifically devices which have simultaneously high gain, low energy output and large gain bandwidth. Low magnification unstable resonators are not suitable for these devices since high magnification is required in order to illuminate a large portion of the grating to minimize the bandwidth of the laser beam.

Although this invention has been shown and described with respect to preferred embodiments thereof it should be understood by those skilled in the art that various changes and omissions in form and detail thereof may be made therein without departing from the spirit and scope of the invention.

Having thus described typical embodiments of our invention that which we claim as new and desired to secure by Letters Patent of the United States is:

1. An unstable resonator having a centerline axis comprising:
   a first optical cavity of providing high resolution to the bandwidth of a beam of electromagnetic radiation, including,
      a first mirror, located on and symmetrically about the centerline axis, defining one end of the first optical cavity and having a reflective surface with a first focal length,
      a diffraction grating, located off the centerline axis, defining the other end of the first cavity, and
      a reflector mirror, located on and symmetrically about the centerline axis, having a flat reflective surface in a plane which intersects the centerline axis at an angle and forms a folded optical path between the reflective surface of the first mirror and the diffraction grating to provide line of sight communication therebetween; and
   a second optical cavity, located on and symmetrically about the centerline axis, with the reflector mirror disposed therein, defined at one end by the first mirror whereby the first and second cavities are partially superimposed and at the other end by a second mirror with a reflective surface having a second focal length less than the first focal length of the first mirror, wherein the reflective surface of the second mirror is in line of sight communication with the reflective surface of the first mirror through an aperture in the reflector mirror.

2. The invention in accordance with claim 1 wherein the ratio of the first focal length to the second focal length is at least 20.

3. The invention in accordance with claim 1 wherein the reflective surface of the first mirror and the reflective surface of the second mirror have a common focal plane within the second cavity.

4. The invention in accordance with claim 3 wherein the aperture in the reflector mirror is located in the common focal plane of the reflective surfaces of the first and second mirrors.

5. The invention in accordance with claim 1 wherein the diffraction grating has at least 600 lines per millimeter.

6. The invention in accordance with claim 1 wherein the first and second mirrors have sperical reflecting surfaces.

7. The invention in accordance with claim 1 wherein the first and second mirrors have cylindrical reflecting surfaces.

8. An unstable resonator having a centerline axis comprising:
   a first optical cavity capable of providing high resolution to the bandwidth of a beam of electromagnetic radiation, including
      a first mirror, located on and symmetrically about the centerline axis, defining one end of the first optical cavity and having a reflective surface with a first focal length,
      a diffraction grating, located off the centerline axis, defining the other end of the first cavity, and
      a reflector mirror located on and symmetrically about the centerline axis, having a flat reflective surface in a plane which intersects the centerline axis at an angle and forms a folded optical path between the reflective surface of the first mirror and the diffraction grating to provide line of sight communication therebetween;
   a second optical cavity, located on and symmetrically about the centerline axis, with the reflector mirror disposed therein, defined at one end by the first mirror whereby the first and second cavities are partially superimposed and at the other end by a second mirror with a reflective surface having a second focal length less than the first focal length of the first mirror, wherein the reflective surface of the second mirror is in line of sight communication with the reflective surface of the first mirror through an aperture in the reflector mirror and including means for coupling a laser beam out of the resonator; and
   a dye cell, located within the second cavity, capable of accommodating an active medium.

9. The invention in accordance with claim 8 wherein the dye cell is located on and symmetrically about the centerline axis between the reflector mirror and the second mirror.

10. The invention in accordance with claim 9 wherein the dye cell has dimensions small compared to the focal length of the second mirror.

11. The invention in accordance with claim 8 further including an etalon, positioned within the first cavity, capable of increasing the resolution of the bandwidth of the laser beam.

12. The invention in accordance with claim 11 wherein the etalon is located off the centerline axis between the reflector mirror and the diffraction grating.

13. The invention in accordance with claim 8 wherein the means for coupling a laser beam out of the resonator is an aperture in the second mirror.

14. The invention in accordance with claim 8 wherein the means for coupling a laser beam out of the resonator is an aperture in the first mirror.

15. The invention in accordance with claim 8 wherein the means for coupling a laser beam from the resonator is a second reflective surface on the reflector mirror.

16. An unstable resonator having a centerline axis comprising:
- a first optical cavity capable of providing high resolution to the bandwidth of a beam of electromagnetic radiation, including
  - a first mirror, located on and symmetrically about the centerline axis, defining one end of the first optical cavity and having a reflective surface with a first focal length,
  - a diffraction grating, located off the centerline axis, defining the other end of the first cavity, and
  - a reflector mirror located on and symmetrically about the centerline axis, having a flat reflective surface in a plane which intersects the centerline axis at an angle and forms a folded optical path between the reflective surface of the first mirror and the diffraction grating to provide line of sight communication therebetween;
- a second optical cavity, located on and symmetrically about the centerline axis, with the reflector mirror disposed therein, defined at one end by the first mirror whereby the first and second cavities are partially superimposed and at the other end by a second mirror formed with material transmissive at the wavelength of the radiation and having a partially reflective surface with a second focal length less than the first focal length of the first mirror wherein the second mirror is capable of out coupling a laser beam from the resonator and the partially reflective surface of the second mirror is in line of sight communication with the reflective surface of the first mirror through an aperture in the reflector mirror; and
- a dye cell, located within the second cavity capable of accommodating an active medium.

* * * * *

UNITED STATES PATENT OFFICE
CERTIFICATE OF CORRECTION

PATENT NO. : 4,123,149
DATED : October 31, 1978
INVENTOR(S) : Peter P. Chenausky and William H. Glenn It is certified that error appears in the above–identified patent and that said Letters Patent are hereby corrected as shown below:

Column 5, Claim 1, line 49: after "cavity" insert --capable--

Column 6, Claim 6, line 23: "sperical" should read --spherical--

Signed and Sealed this

Twentieth Day of February 1979

[SEAL]

Attest:

RUTH C. MASON
Attesting Officer

DONALD W. BANNER
Commissioner of Patents and Trademarks